United States Patent [19]

Lange et al.

[11] 4,115,694

[45] Sep. 19, 1978

[54] SCINTILLATION CAMERA SYSTEM WITH IMPROVED MEANS FOR CORRECTING NONUNIFORMITY IN REAL TIME

[75] Inventors: Kai Lange, Vedbaek; Verner Toefting, Nivaa, both of Denmark; Ernest J. Wiesen, Wauwatosa; Robert R. Lijewski, Milwaukee, both of Wis.

[73] Assignee: General Electric Company, Schenectady, N.Y.

[21] Appl. No.: 787,122

[22] Filed: Apr. 13, 1977

[51] Int. Cl.² .................................................. G01T 1/20

[52] U.S. Cl. ................................ 250/363 S; 250/369; 364/521

[58] Field of Search ............................ 250/363 S, 369; 235/151.3, 151.35; 358/110, 111

[56] References Cited

U.S. PATENT DOCUMENTS

| | | | |
|---|---|---|---|
| Re. 28,451 | 6/1975 | Spleha et al. | 260/363 S |
| 3,878,373 | 4/1975 | Blum | 235/151.3 |

*Primary Examiner*—Alfred E. Smith
*Assistant Examiner*—Janice A. Howell
*Attorney, Agent, or Firm*—Ralph G. Hohenfeldt

[57] ABSTRACT

In a gamma camera system a computer calculates the $x$ and $y$ coordinates of scintillations and a pulse height analyzer determines if they are within the proper amplitude limits for being displayed on a cathode ray tube at corresponding coordinates. Means are provided for correcting nonuniformity or lack of correspondence between the positions of the scintillations and their calculated coordinates. In an accumulation mode, a first memory matrix stores pulse counts for incremental areas of the radiation field when a uniform source is presented to the detectors. When a predetermined maximum number of counts is reached in at least one memory location accumulation is interrupted at which time other locations have fewer counts in them. In the run mode counts are stored in corresponding locations in a second memory matrix and these counts are compared continuously with those in locations in the first memory. Means are provided for injecting a number of counts to make up for the difference between the counts for a given area increment and the counts that should have been obtained for a uniform source.

11 Claims, 6 Drawing Figures

SCINTILLATION CAMERA SYSTEM WITH IMPROVED MEANS FOR CORRECTING NONUNIFORMITY IN REAL TIME

BACKGROUND OF THE INVENTION

This invention relates to scintillation cameras, commonly called gamma cameras, and is particularly concerned with correcting for nonuniformities or lack of positional correspondence between the distribution of radiation events in incremental areas of the camera field and in the displayed image.

In nuclear medicine, gamma camera systems are used to detect gamma ray photons emitted from a body in which a radioisotope has been infused. Scintillations occur where photons are absorbed by crystalline material. A typical system is based on the camera of Anger as disclosed in U.S. Pat. No. 3,011,057. The Anger camera, as does the camera in this disclosure, comprises an array of photosensitive devices such as photomultiplier tubes, usually hexagonally arranged, having their input ends adjacent a light conducting plate or disc. Beneath the disc is a scintillation crystal which converts incoming gamma photons into light photons or scintillations. A collimator is interposed between the scintillator and the emitting body so that photons emitted will impinge substantially perpendicularly to the planar scintillation crystal.

The array of photomultiplier tubes view overlapping areas of the scintillation crystal. The tubes produces a pulse for each scintillation event. Well-known electronic circuits are used to produce signals representing the $x$ and $y$ coordinates of the scintillations. A pulse height analyzer determines if the pulses are within amplitude limits and, if they are, a $z$ signal is produced which controls a cathode ray oscilloscope display to produce a point of light on its screen at $x$ and $y$ coordinates corresponding with those of the scintillation event intercepted by the camera. A photographic film may be used as an image intergrator of the large number of light spots appearing on the screen of the cathode ray tube. A substantial number of events is required to make up the final picture of radioisotope distribution in the body tissue.

A problem in existing scintillation camera systems is that if a standard source having uniform isotope distribution is placed close to the crystal and a photograph is made of the image on the display tube, the photograph will show nonuniformity which results from so called "hot spots" under each photomultiplier tube and "cold spots" between the tubes. The transitions between hot and cold areas are rather gradual than abrupt. In other words, a spot or scintillation event actually occurring between photomultiplier tubes is sensed as being partially shifted under the tubes, causing a decrease in spot density between the tubes and an apparent increase in spot density under the tubes.

One method of correcting for nonuniformity uses a computer memory to store the count distribution taken from a flood field or uniform standard source. Some of the locations in the computer memory will then have fewer counts than they should have for a uniform radiation field. Hence, after the image is formed, the computer determines the areas of nonuniformity and corrects those areas by adding or subtracting counts and the image is displayed on a cathode ray tube. The problem with this method is that correction is made after the image of the body has been produced as opposed to the correction being made in real time as the image is being produced. This precludes correcting under dynamic conditions.

Another recently developed method is to use a computer based on a microprocessor. This method is believed to use the microprocessor for determining the deficiency of counts as compared with counts taken from a flat flood field and stored in a memory. The deficiencies are compared with randomly generated numbers and all of those memory locations which have counts in excess of a minimum result in inhibition of unblanking of the cathode ray display which amounts to subtracting counts in order to make the image uniform as opposed to injecting counts where there are deficiencies.

SUMMARY OF THE INVENTION

An object of the present invention is to correct for nonuniformity between the distribution of scintillation events detected by a gamma camera and the distribution in a display by adding counts or light spots in areas of the display which would have been there if there were not distortion between the actual and sensed positions of the events.

Another object is to provide correction for nonuniformity in real time, that is, substantially coincident with generation of the image of the body or portion of it which is being imaged.

A further object is to provide a real time correction system which does not employ a microprocessor and, hence, does not experience delays and missing counts which might result from cycling time limitations of a microprocessor.

Yet another object of the invention is to provide a nonuniformity correction scheme with enough capacity for accumulating and storing counts to assure high statistical accuracy and which will correct incremental areas of an image at regular intervals by an amount which depends on the size of the error.

Still another object is to provide correction apparatus which corrects often enough at short counting intervals to make a significant improvement in correcting a dynamic image where the pulse counts are low.

Another object is to obtain statistically favorable correction by adding pulses to image areas which are deficient in counts due to the camera not responding as well to scintillations in some areas as compared with others.

Briefly stated, the new circuit has two modes of operation. One is calibration or accumulation mode and the other is a run mode. In the accumulation mode, a standard having a uniformly distributed radioisotope material is placed in view of the camera. The pulse counts within small area increments of the radiation field are stored in a binary digit number memory matrix. When one stack of cells comprising a memory location is filled, the count is terminated leaving other locations with fewer than the number of counts they should contain when there is a uniform source in the field of the camera. The system is then switched to run mode for normal imaging of a radiation emitting body in the field of the camera. The most significant bits of the accumulate count are stored in a reference memory. During the run mode, counts for incremental areas are stored in corresponding areas in a second memory. The counts in the reference and run memories are continuously compared during the run mode and additional pulses are injected in the various incremental areas depending in number on the difference between the reference count and the run mode count for each memory location. In one embodiment it is contemplated to add all of the counts necessary to make up a deficiency in each reference memory location and, hence, for each incremental area after the number of counts in the run memory exceeds the number of counts in the corresponding reference memory locations. In the preferred embodiment to be described herein, correction pulses, actually $z$ signals, are injected periodically during the run mode and the number of corrections made depends on the size of the error or difference between the number of counts that are accumulated and the number that should have been accumulated in each area in view of the photodectors for a uniform radiation source.

How the foregoing and other more specific objects of the invention are achieved will appear in the ensuing more detailed description of a preferred embodiment of the invention in reference to the drawings.

DESCRIPTION OF A PREFERRED EMBODIMENT

Figure 1:
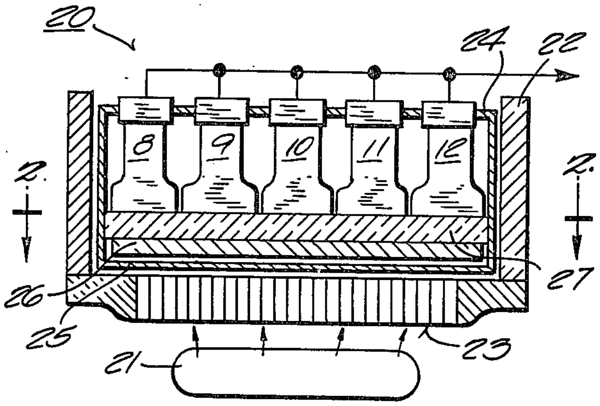
FIG. 1 is a schematic side view of a detector head of a scintillation camera, partly in section.
Figure 2:
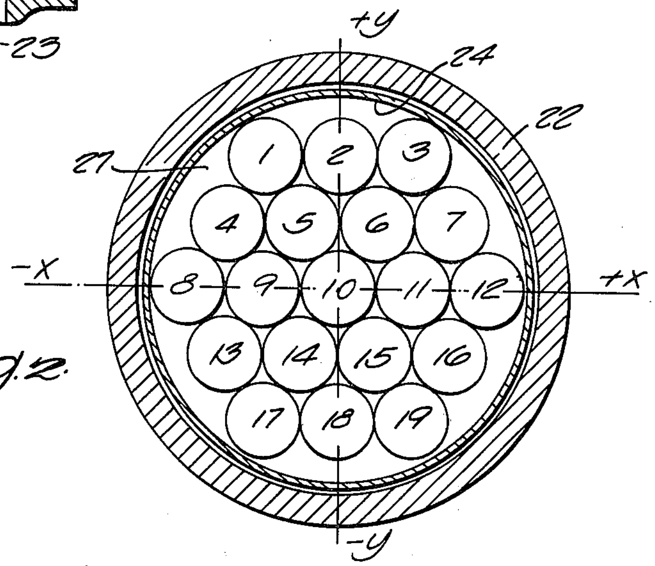
FIG. 2 is a schematic diagram of a section taken on a line corresponding with 2—2 in FIG. 1 and showing a hexagonally arranged array of photomultiplier tubes in a scintillation camera.

FIGS. 1 and 2 show schematic vertical and transverse sections, respectively, of a scintillation camera with which the new nonuniformity correction system may be used. In FIG. 1, the scintillation camera is generally designated by the reference numeral 20. It is disposed over a body 21 which may be infused with a radioisotope whose photon emission pattern enables forming a visible image of the tissue in which the isotope is absorbed. Gamma camera 20 intercepts photons which are emitted by the isotope which is usually a gamma ray emitter. The illustrated conventional camera comprises a radiation opaque housing 22 which has a collimator 23 fastened to its bottom. The collimator is comprised of an array of gamma radiation permeable tubes with impermeable material between them. Inside of the housing is a closed container 24 which has gamma ray photon permeable bottom 25. Above bottom 25 is a planar disc 26 made of crystalline material such as thallium activated sodium iodide which produces a scintillation event at any point where it absorbs a gamma ray photon. An array of photsensitive devices such as photomultiplier tubes 1–19 are located above scintillator crystal 26. The photomultiplier tubes are coupled to crystal 26 with a light pipe 27 which may be a glass plate. Scintillations in crystal 26 are detected by the tubes which each produce pulse output signals for each scintillation event.

As can be seen in FIG. 2, nineteen photomultiplier tubes 1–19 are used in this example. They are arranged hexagonally about a central tube 10. Nineteen is a common number of tubes used in scintillation cameras but cameras with 37 photomultiplier tubes are also used. The new nonuniformity correction system may be used in systems having 19 or 37 or other numbers of tubes.

Gamma cameras of the type just outlined cooperate with electronic circuitry for computing analog signals which are representative of the $x$ and $y$ coordinates of each scintillation. For each scintillation there is appropriate deflection and unblanking of the cathode ray tube and the scintillations are displayed as light spots on the face of a cathode ray tube at coordinates corresponding with those of the scintillations. If a statistically sufficient number of counts is taken, an image of the part of the body infushed with radioisotope may be visualized on the face of the cathode ray tube.

It is well known that even when a test object having substantially uniform radioisotope distribution is presented toward the input end of a gamma camera such as the one described above, the computed coordinates of the scintillations tend to bunch up when displayed, thus exhibiting a phenomena which is characterized as "hot spots" under and near each photomultiplier tube and "cold spots" between them. The intensity differences between the tubes are gradual but they are visible on the display tube. The present invention is for correcting this nonuniformity in real time, that is, concurrently with imaging an actual radioisotope infused body.

Figure 3:
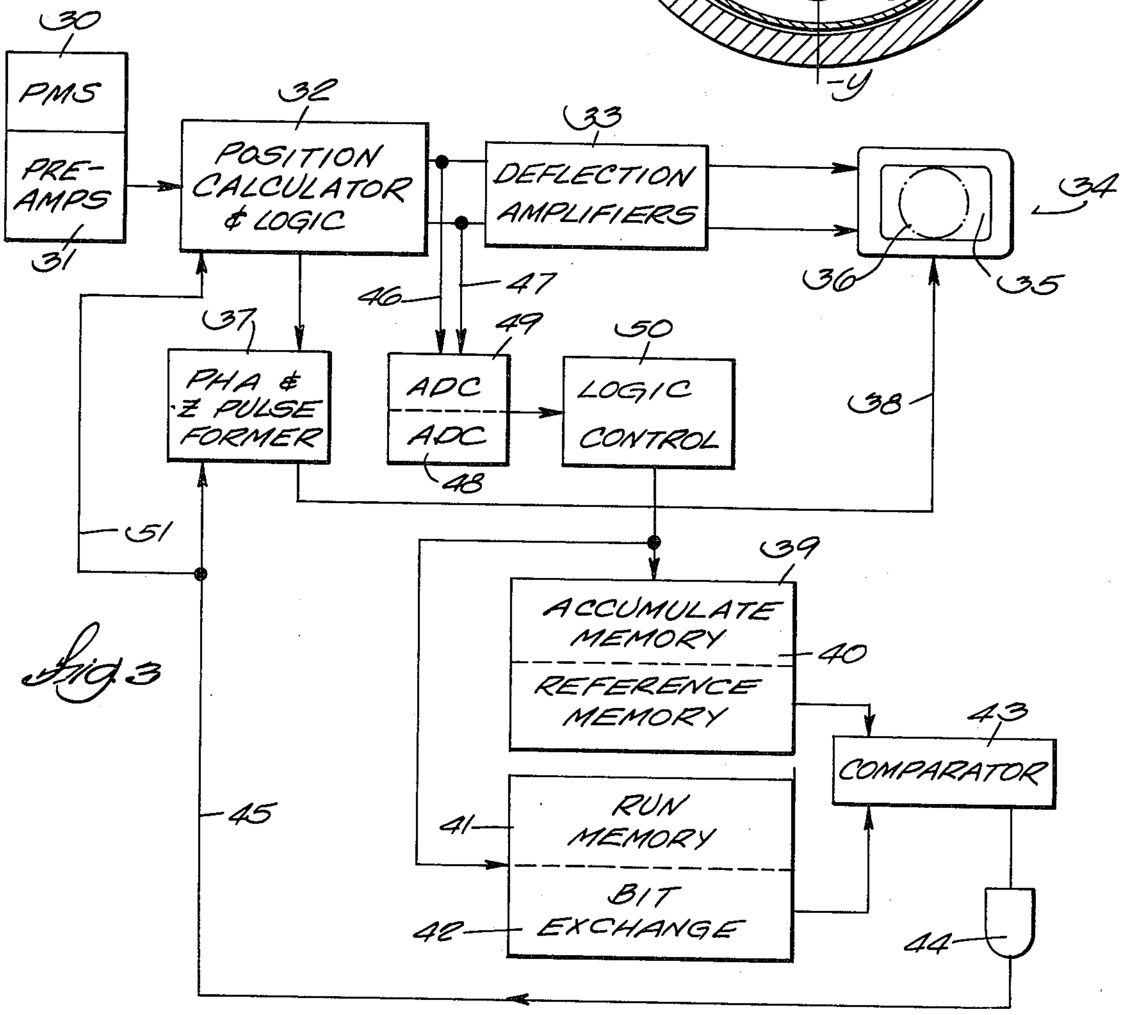
FIG. 3 is a block diagram of a part of scintillation camera system employing the new nonuniformity correction means.

Attention is now invited to FIG. 3 which is essentially a flow diagram of a conventional system in conjunction with the schematically represented components of the new nonuniformity correction system. The photomultiplier tubes 1–19 are indicated collectively by the reference number 30. The analog signal outputs which these tubes produce for each scintillation are processed in preamplifiers 31 and supplied to a computer that is designated as a position calculator and logic block 32 which is assumed to be conventional and is operative to calculate four coordinate signals $+x$, $-x$, $+y$ and $-y$ to output pairs of $x$ and $y$ coordinate signals which are supplied to $x$ and $y$ deflection amplifiers in the block 33 for the cathode ray tube. The deflection amplifiers drive electrostatic or electromagnetic deflection means in a cathode ray oscilloscope display which is generally designated by the reference number 34 and will be called a monitor for the sake of brevity. The face plate or display screen of monitor 34 is marked 35. A displayed image is symbolized by the circle 36.

As is well known, all coordinate signals do not necessarily result in an intensity change such as a light spot occurring at a corresponding position on the cathode ray tube screen 35 or whatever type of display is used. Only those which result from pulses of the photomultiplier tubes which fall within a predetermined energy window of a pulse height analyzer result in intensity changes or light spots in this embodiment. Thus, in the present case as in conventional systems, a pulse height analyzer and $z$ pulse former 37 are provided. Analog signal pulses which are within the window limits of the analyzer produce $z$ pulses which are delivered to monitor 34 and unblank it so that a light spot will be produced at the coordinates of the signals coming from the deflection amplifiers 33. The $z$ or unblanking signals are conducted to the monitor by way of line 38.

If a writing device, not shown, which produced hard copy were used for display of the image instead of the cathode ray tube used herein, the $z$ pulses might be used to cause the device to put a mark on image recording paper, for instance, or to produce some intensity change other than a light spot. Hence, it should be understood that the term "intensity change" is intended to include making light spots and other forms of writing.

Traditional practice is to reduce nonuniformities in the display of the extent possible by tuning or balancing the photomultiplier tube outputs. As is known, the procedure involves presenting a source with a uniform distribution of radioisotope toward the camera input and then tuning until the best uniformity is obtained on the display tube screen.

In an embodiment of the present invention, a flood or flat field is obtained with a uniform source presented to the camera input after it has been pretuned and at any time that calibration of the system is desired. The number of counts of scintillation events in small area increments of the radiation field viewed by the camera are stored in a twelve-plane digital memory matrix 39 which is identified as an accumulate memory. Typically, for this example, each plane might have 32×32 or 64×64 one bit cells so the maximum number of counts in each location may be $2^{12}$ or 4096. The least significant bits of the accumulated counts are dropped and the six most significant bits are retained. The most significant bits become the reference memory 40 after the accumulate mode is terminated. Termination is automatic when one of the locations in the accumulate memory is filled in which case most if not all other locations will contain an equal or lesser number of counts due to the inherent nonuniformity which was discussed above. The vacancies left by dropping the least significant bits are used as a six bit memory during the run mode.

In the run mode a body infushed with radioisotope is in view of the camera for being imaged. During the run mode, the pulse counts are delivered to the run memory 41 which comprises the six planes made available by dropping the bits. Locations in the run memory correspond in $x$ and $y$ coordinate positions with incremental areas in the scintillation camera field. During the run mode, the contents of run memory 41 are compared to the contents of reference memory 40 with a comparator 43. At any time that the number of counts in a run memory location is equal to or exceeds the number of counts in the corresponding location of the reference memory, the comparator is operative to have its output signal gated, with a gate 44, for delivery by way of line 45 to the $z$ pulse former 37. Every time a signal is gated, an additional $z$ pulse and intensity change or light spot occurs in the corresponding incremental area on display screen 35. Thus, the basic concept is to provide as many additional $z$ pulses for each location or area increment as are required to make up the difference between the counts that should have been in the corresponding location of the accumulate memory for a uniform source and the number of counts that are in the filled location of the accumulate memory. When the run memory locations are filled, the system recycles and the correct proportion of additional counts or pulses are supplied on a real time basis during the entire run mode.

In FIG. 3, the flow diagram indicates a bit exchange procedure 42 wherein the most significant bits of the run memory binary digital numbers are exchanged to the positions occupied by the most significant bits before comparison in the comparator with the most significant bits of the counts in the reference memory. This permits, a will be explained in detail later, injecting the additional pulses or counts periodically during filling of the locations in the run memory instead of waiting to correct the deficiency in each location after the comparator has determined that the number of counts in the run memory exceeds the number of counts in the corresponding cell of the reference memory. This optimizes nonuniformity correction for use on low count images.

Further in FIG. 3 it will be noted that, in accordance with the invention, the accumulate mode and the consecutive run mode $x$ and $y$ coordinate signals for the scintillation events are supplied respectively by way of lines 46 and 47 to a pair of analog-to-digital converters (ADC) 48 and 49. The digital output signals from the converters are addressed by means of logic and control circuitry 50 to the accumulate memory matrix 39 during the accumulate or calibrate mode and to the run memory 41 during the run mode.

Figure 5:
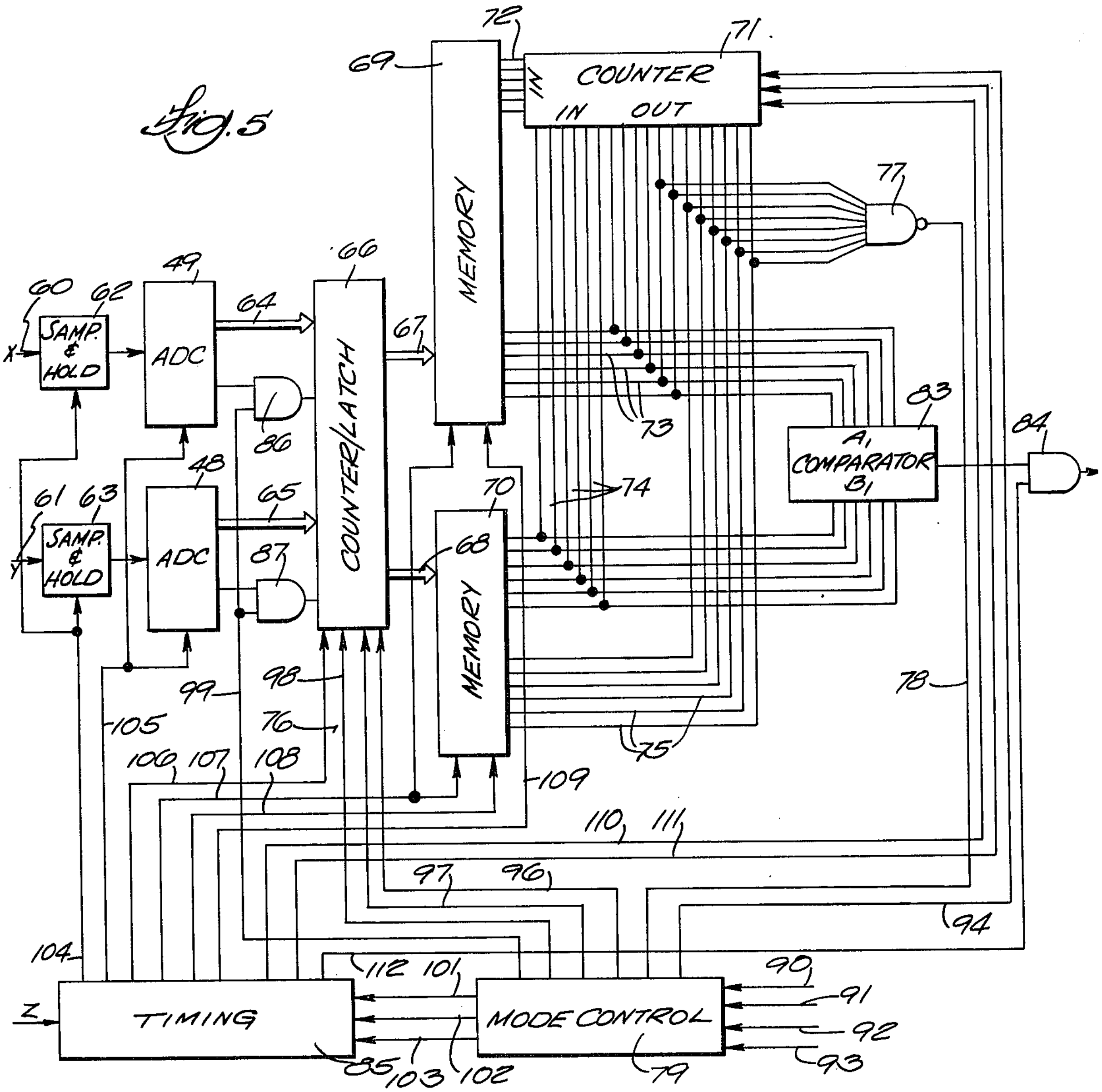
FIG. 5 is a circuit diagram showing the essential features of the new nonuniformity correction means.

A more detailed description of the new nonuniformity correction circuit will now be given in reference to FIG. 5. In this figure, the analog $x$ and $y$ coordinate signals for each scintillation event come in on lines 60 and 61 from the position calculator 32 which was referred to in FIG. 3. In FIG. 5, the analog signals are supplied to a pair of sample and hold devices 62 and 63. The sample and hold devices assure that the analog signals will be stable when they are processed by adjacent analog-to-digital converters 48 and 49. Each of these converters are preferably capable of converting the analog input signals to 5 or 6-bit digital output signals. Fast ADCs are used which are capable of converting in less than a microsecond. The output signals from converter 49 are conducted with a bus 64 that is capable of handling 5 or 6-bit digital numbers which are effectively $x$ location memory addresses. A similar bus 65 conducts the 5 or 6-bit buses 67 and 68 to memories 69 and 70, respectively. Memories 69 and 70 are equivalents of memories 39, 40 and 41 which were used in FIG. 3 for explanatory purposes. Memories 69 and 70 are used in both the accumulate and run or correction modes.

Figure 4:
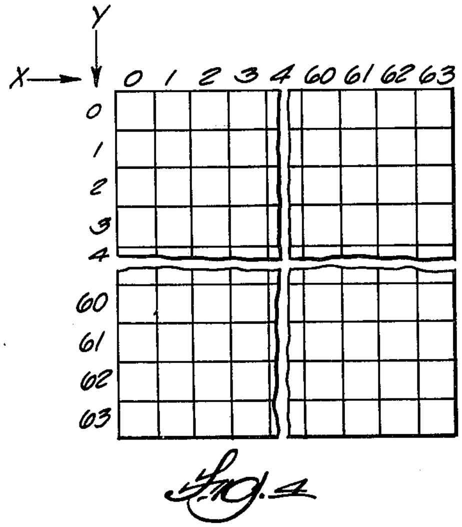
FIG. 4 is a diagram of one plane of a matrix memory for the purpose of explaining features of the invention.

In this embodiment, the memories are comprised of a matrix of 64×64 cells per plane and there are twelve planes so all vertically coincident cells comprise locations which are capable of storing a 12-bit binary number having a maximum value of decimal 4096. One of the memory planes is shown symbolically in FIG. 4 and is seen to comprises 0–63 or 64 bits in each direction. Each cell or bit in a plane has an $xy$ coordinate which corresponds with the location of an incremental area under the array of photomultiplier tubes. Typically, the incremental areas in the camera field may be 24×24 mm. The memories that are used in a commercial embodiment of the correction system may be alternately organized for 64×64 or 32×32 bits per plane. As mentioned earlier, variations in intensity of the radiation field as sensed by the photomultiplier tubes are gradual rather than abrupt in the spaces under the photomultiplier tubes and between them so adequate correction can be obtained using the memory with the smaller number of bit locations.

Returning to FIG. 5, the 5 or 6-bit digital signals, corresponding with the positions of scintillation events, from the converters 48 and 49 constitute addresses to memories 69 and 70. All cells in all planes of the memories are addressable. Every incoming pair of analog $x$ and $y$ coordinate signals is converted to a digital number which become memory cell addresses. In the accumulation mode, each time the coordinate number which has been converted to a digital number addresses the digital memory, the entire stored binary number in that location to which the new count number is addressed is removed and incremented by one and returned to the memory for storage. This known routine involves using a 12-bit counter 71. The new digital numbers supplied to the memory cannot be incremented by one in the memory so the existing digital number for an $x$ coordinate in a location in the stack of planes is read out over lines 72 by the counter in which the number is incremented by one and fed back to the same memory location from which the number was removed by way of lines 73. Counts for the $y$ coordinates are similarly processed by removing the existing counts in the addressed locations and feeding them to counter 71 by way of lines 74 and, after incrementing by one in the counter, they are returned to memory 70 by way of lines 75.

The 12-bit counter/latch 66 mentioned earlier is not active during the accumulating mode. Its purpose is to assure that all locations in the memories are clear before accumulation is initiated. The memories are usually not povided with means for setting all locations to zero so counter 66 is used. It is supplied with a clock signal by way of line 76 which is activated for a few milliseconds initially to run through all of the memory cell addresses and write zeros into all of these cells. After the memory locations are all zero or cleared and during the accumulation and run modes, all address signals for event counts simply pass through the counter/latch 66.

As indicated above, in this example the memory has a depth of 12 bits so a maximum of $2^{12}$ or 4096 counts can be accumulated in each memory location. In the accumulation mode, the event count is terminated when one memory location has the eight most significant bits all set to 1, corresponding to a content of $2^{12} - 2^4$ or 4080 counts. When at least the one location has this many counts, it is sensed on the inputs to NAND gate 77 and its output changes state. When the gate changes state, it provides a signal over a line 78 to the mode control module 79 which terminates any further accumulation of counts. At this time, all of the other memory locations which store the counts for corresponding area increments in the field of the photomultiplier tubes will be less than full. In other words, there will be a deficiency of counts in most memory locations even though a uniform radioactive source is in the field during the accumulation mode. The maximum count in the full location only has to be high enough to obtain a low statistical standard deviation. A maximum count which is adequate for the accuracy required is obtained when one memory location of a $32 \times 32 \times 12$ bit matrix is filled. Use of a $64 \times 64 \times 12$ bit memory requires for times to fill because many more additional counts will be required before one memory location is filled to overflowing.

After having accumulated counts with a uniform flood field the nonuniformity correction apparatus is switched to the correction mode. In the correction mode the same memory is divided into two parts, the run memory 41 and the reference memory, which were mentioned briefly when FIG. 3 was being discussed. Recall that run memory space was obtained by dropping the least significant bits of the accumulated counts. The run memory part and the reference memory part of the memories which are generally designated by the numerals 69 and 70 are each organized as $64 \times 64 \times 6$ bits or alternatively $32 \times 32 \times 6$ bits. For the sake of simplifying the remaining discussion it will be assumed that $32 \times 32 \times 6$ memories are selected for the run mode and for the reference memory after the accumulate mode is terminated.

The six most significant bits in each accumulate memory 39 location are stored as the reference memory 40 counts during the run mode as previously explained. The run memory 41 is a revolving memory as was described in connection with accumulation where for each scintillation event the content of the corresponding location in the run memory is incremented by one. When all bits in any location in the run memory are set to one, the next event assigned to that location will turn all bits in the location to zero if the image run continues and each location will begin again to store counts until it is filled.

During the run mode, a body which has been infused with a radioisotope is in the field of view of the camera. As the event counts for incremental areas of the field come into the run memory at corresponding coordinate locations, each run memory location is incremented by one and when a binary number which has six bits or a maximum of 64 is counted the filled location recyles. The digital numbers A in the run memory locations are continuously compared to the digital numbers B in the corresponding locations of the reference memory by a comparator 83 in FIG. 5 which is equivalent to comparator 43 in FIG. 3. If A is greater than B is true, a correction pulse will be generated. Thus, for each memory location a number of 63-B correction pulses are generated for every 64 pulses in this example. The correction pulses are gated in gate 84 in FIG. 5, which is equivalent to gate 44 in FIG. 3, and sent to the $z$ pulse former 37 in FIG. 3 such that for each event causing a total number of counts in the run memory location in excess of the number of counts in the corresponding reference memory location an additional $z$ pulse will be formed and an additional spot will be inserted in the appropriate area increment in the image on the monitor screen 35 to correct for the nonuniformity. Adding additional correction pulses or light spots may begin as soon as any location in the run memory develops a count which is greater than the deficient count stored in the reference memory in a corresponding location. Then, when the number of additional counts is sufficient to bring the run memory location up to the level of the filled reference location, the run memory location is recycled as described above in which case the number of corrections made in each incremental area is proportional to the size of the error for the area.

Figure 6:
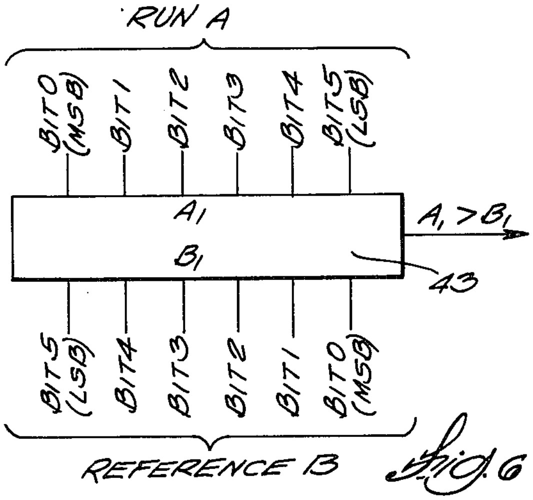
FIG. 6 is a diagram for facilitating explanation of how counts in an accumulator or reference memory are compared with counts in a run memory.

In the preferred embodiment herein described, however, the memory outputs of the run memory A and the reference memory B are not compared directly. The bits in the run memory are interchanged, bit 0 by bit 5, bit 1 by bit 4 and bit 2 by bit 3 as illustrated in FIG. 6. The interchange is accomplished simply by connecting the least significant bit output pin of the memory to what is normally the most significant bit input pin of the comparator 83 and connecting the most significant bit output pin of the memory to the least significant bit output pin of the memory to the least significant bit input pin of the comparator and similarly reversing the sequence of the intervening outputs and inputs. When counting run memory A locations from 0–63, A is greater than B will be true exactly as often as $A_1$ is greater than $B_1$, because $B = B_1$ and all different combinations of bits occur in both A and $A_1$ just one. Interchanging the bits in the run memory A thus does not affect the correcting factor, but the correcting pulses will be more equally spaced in time. For example, B=59 means that 4 pulses of every 64 pulses are correction pulses. If the bits in A were not interchanged, the 4 correction pulses would occur as 4 pulses in succession as implied in the preceding paragraph. Now every sixteenth pulse is a correction pulse where 4 correction pulses are required.

Refer to Tables 1 and 2 for a concrete example of how the number of correction pulses required in a location during the run mode can be predicted and how they can be interspersed over the count instead of only being added in succession after the count in a run location exceeds the count in a corresponding reference memory location. In Table 1 there are 64 column headings 0–63 in decimal form. Their corresponding digital numbers are written below the decimal numbers. With the least signficant bit (*lsb*) at the bottom of each column of digital numbers and with the most significant bit (*msb*) at the top. At the left, the positional values 32, 16, 8, 4, 2 and 1 of the bits are give for 0–63. Assume in this example that a particular reference memory location has the 53 counts stored in it which are indicated at the left of Table 1. This means that this particular location has a count 10 bits under that of the 64 counts in a filled accumulate memory location as indicated.

Table 2 is essentially an inversion of Table 1 wherein the most significant bit of Table 1 is interchanged with the least significant bit in Table 2. Thus, in Table 2 the top bit is least significant. Immediately above each binary number in Table 2, its decimal value is given. In this example we are assuming that there is a ten count deficiency. So every time the comparator 43 finds the value of the bit interchanged numbers in the run memory to be greater than the regular binary numbers in the corresponding reference memory location, a correction pulse will be injected and the number of correction pulses will depend on the magnitude of the error which is 10 in this example. Referring to Table 2, a row of arrows is used to indicate those places where the run memory exceeds the reference memory count. Thus, when the bit exchanged numbers in Table 2 have values of 56, 60, 58, 54, 62, 57, 61, 59, 55 and 63 there is an arrow in the upper row of arrows indicating that a correction pulse in addition to the normal coincident *z* pulse is injected. Note that there are a total of 10 arrows corresponding with the 10 bit error.

Consider another example where the count in a reference memory location is low by 14 as compared with the 64 counts it should have as indicated by the filled location in the accumulate memory which has a maximum of 64 considering that only the 6 significant bits are used. In such case the corresponding run memory location under consideration would otherwise be likely to accrue a binary count of 110010 or decimal 50 as compared with the binary count of 111111 which it should have and that run memory location would need to have 14 counts added for every 50 counts during the run mode. In the case of a 14 count error, one may see in Table 2 that correction *z* pulses will be injected each time the transposed count in the run memory location exceeds 50. Thus, correction pulses are inserted, as indicated by the lower row of arrows, at counts 56, 52, 60, 50, 58, 54, 62, 57, 53, 61, 51, 59, 55 and 63. In this case there are 14 arrows indicating that there are 14 correction pulses injected as is appropriate for an error of 14 in the particular memory location. When any memory location becomes filled, it simply returns to 0 and recycles, making the same proportional correction as in the initial cycle which was described. Thus, it will be seen that the correction pulses occur at different times and not in uninterrupted succession so they will be more evenly distributed within the area increment of the image being displayed. Corrections are made in real time while the image is being run. The only area that gets not correction is the one that produced the filled memory location during the accumulation mode.

The run mode will now be recapitulated in reference to the FIG. 5 circuit diagram. Assume that the reference memory locations use 6 planes in a 32×32 matrix (or optionally 64×64) in memory block 70. The reference memory locations store the 6 *msb* of the counts in corresponding locations acquired during the accumulation mode. The counts in each reference memory location are clocked to the $B_1$ inputs of comparator 83 in coincidence with the particular corresponding location in locations in block 69 which are used for run memory. Each time a count comes into a run memory location during the run mode, the count is removed from the memory, incremented by one, returned to its location and also applied to the $A_1$ inputs of comparator 83. The fact that the most significant bits of the run counts $A_1$ are reversed as compared with the reference count bits is apparent from the *lsb* and *msb* labeling of the lines to $A_1$ and $B_1$ inputs of the comparator.

Each location in the run count memory counts from 0 to 63 binary or 64 counts total in decimal notation and it recycles. In counting to 64 with its *lsb* and msb exchanged positionally the occasions when its counts exceed the reference counts will come up periodically and exactly as many times as the numerical difference between the reference and run count memory locations. Hence, each time $A_1$ exceeds $B_1$ in the course of a run count, comparator 83 responds to occurrence of the higher number of enabling gate 84 to trigger a *z* pulse and an extra intensity change or light spot in the incremental area of the cathode ray tube image corresponding with the same run memory and reference memory locations and the area increment in the scintillation camera field.

From the description thus far it would appear that the extra intensity or light spot changes might occur in the image display in substantial spatial coincidence. The spots may be shifted in space, if desired, by means which are shown in FIG. 3. Mention was made previously of the signals for extra pulses being supplied from gate 44 to the *z* pulse former 37 by way of line 45. There is also a line 51 branching from line 45 to position calculator and logic block 32. The signals on line 51 may be supplied to block 32 in the camera for controlling it to cause a small spatial increment so that the added *z* pulse is not on top of the first pulse.

Although sufficient description of function and structure have been set forth to enable anyone who is knowledgeable about the digital logic and gamma camera arts to reproduce the new nonuniformity correction system, a brief discussion of the timing and control aspects of the system will be given in reference to FIG. 5. In FIG. 5, there is a mode control module 79 which is entered and exited by a number of lines which are marked in accordance with their functions.

Thus, at the right of mode control module 79 are four lines 90–93. A signal is supplied on line 90 when it is desired to use the memory matrix in a 32×32 format and a signal is supplied on line 91 when the optional 64×64 format is desired. As indicated earlier, the spatial frequency of error in the camera field is low enough for the 32×32 format to be satisfactory for nonuniformity correction. Lines 92 and 93 are used to supply on and off control signals.

The mode control 79 supplies a pulse over line 94 to clear counter 71 prior to the start of the accumulation and run modes. Line 78 delivers a pulse to the mode control module from gate 77 to stop accumulation when all inputs of gate 77 are at the same logic high level. Line 96 receives a pulse from counter/latch 66 when clearing of memories 69 and 70 is complete during intializing. A pulse is supplied from the mode control by way of line 97 to the counter/latch 66 to switch it to a state where it will pass the digital signals directly to the memories after the memories have been cleared. Line 98 supplies a pulse to latch 66 which causes the latch to go into its memory clearing or zeroing mode for a few cycles during initialization. Line 99 furnishes a low signal to gates 86 and 87 when the mode control is commanding use of the 32×32 memory format and it surnishes a high signal when the 64×64 format is commanded.

The timing module 85 synchronizes the system. It provides a signal over line 104 to the sample and hold circuits 62 and 63 that endures for the time which it is desired to hold the $x$ and $y$ analog signals so no counts are dropped by the ADCs 48 and 49. There is a hold signal for every $z$ signal that is supplied to the timing module. A signal by way of line 105 triggers the ADCs to convert. It is shorter than the hold signal. A pulse signal from timing module 85 over line 106 causes the latch 66 to go into its count mode. A change of state on line 107 enables the memories. A signal on lines 108 and 109 changes state to switch the memories between read and write modes. A signal on line 110 changes state to cause counter 71 to increment. A pulse signal on line 111 causes counter 71 to load. A pulse on line 112 coincident with a $z$ pulse input to the timing module causes gate 84 to produce the additional $z$ pulses in response to the comparator 83.

Although the best mode and apparatus presently contemplated has been described above for accumulating counts of scintillation events in incremental areas at the time a known uniform source is in the camera field, then counting events in corresponding areas during the time when an examination subject is in the field, and then comparing the counts obtained during the first time with those obtained during the second time and providing additional counts to an extent depending on the size of the discrepancy, those skilled in the gamma camera and digital electronics arts will appreciate that these concepts might be embodied in various ways. For instance, shift registers instead of memory matrixes could be used to store counts for area increments during each mode and various timing and comparison schemes might be used. Hence, the above description is merely illustrative and the scope of the invention is to be limited only by construing the claims which follow.

TABLE 1

| | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0–63 | 53 | | | | | | | | | | | | | | | | | | | | | | | | | | | | | | | | |
| 32 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 1 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 8 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 4 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 2 | 0 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 10 Bits Low | | | | | | | | | | | | | | | | | | | | | | | | | | | | | | | | | |
| | | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| | | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| | | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| | | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| | | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |

TABLE 2

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 3 | 1 | 4 | 0 | 4 | 2 | 5 | 0 | 3 | 2 | 5 | 1 | 4 | 2 | 6 | 0 | 3 | 1 | 5 | 1 | 4 | 2 | 5 | 0 | 3 | 2 | 5 | 1 | 4 | 3 | 6 |
| | 0 | 2 | 6 | 8 | 8 | 0 | 4 | 6 | 4 | 6 | 0 | 2 | 2 | 4 | 8 | 0 | 2 | 4 | 8 | 0 | 0 | 2 | 6 | 8 | 6 | 8 | 2 | 4 | 4 | 5 | 0 | 2 |
| 32 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 16 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 8 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 4 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | | | | | | | ↑ | | | | ↑ | | | | ↑ | | | | ↑ | | | | ↑ | | | | ↑ | | | | ↑ |

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 3 | 1 | 4 | 0 | 4 | 2 | 5 | 0 | 3 | 2 | 5 | 1 | 4 | 2 | 6 | 0 | 3 | 1 | 5 | 1 | 4 | 2 | 5 | 0 | 3 | 2 | 5 | 3 | 4 | 3 | 6 |
| | 1 | 3 | 7 | 9 | 9 | 1 | 5 | 7 | 5 | 7 | 1 | 3 | 3 | 5 | 9 | 1 | 3 | 5 | 9 | 1 | 1 | 3 | 7 | 9 | 7 | 9 | 3 | 5 | 1 | 7 | 1 | 3 |
| 32 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 16 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 8 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 4 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | | | | | | | ↑ | | | | ↑ | | | | ↑ | | | | ↑ | | | | ↑ | | | | ↑ | | | | ↑ |

We claim:

1. In a scintillation camera system comprising means responsive to intercepting radiation over a relatively large area field by producing scintillation events, means for detecting said events and operative to produce corresponding electric signals, means responsive to said electric signals by producing signals which represent the positions of said events, means responsive to said signals being within predetermined limits by producing $z$ signals, display means responsive to occurrence of $z$ signals by producing intensity changes, respectively, corresponding substantially with the positions of said events, improved means for correcting for nonuniformity between the positions of said events and their positions on said display means, comprising:

accumulate memory means operative during an accumulate mode to accumulate and store in binary digital form counts of said events occurring in small areas, respectively, within said large area field when a substantially uniform radiation field is presented to said means for detecting radiations, means for terminating counting of said events when the counts corresponding with at least one of said small areas attains a predetermined number and when counts corresponding with others of said small areas may be lower than said predetermined number, run memory means operative during a run mode to store in binary digital form counts of said events occurring in small areas within said field corresponding with the aforesaid small areas when a body containing a radioactive substance is presented to said means for detecting radiation, comparator means operative to continuously compare counts corresponding with counts accumulated for said small areas during said accumulation mode with counts for corresponding areas during said run mode and operative to produce a number of correlation signals substantially equal to the difference between the numbers of counts in said memories for each of said areas, respectively, and said $z$ signal producing means responding to said correction signals by causing an intensity change in a corresponding area on said display means.

2. In a scintillation camera system comprising means for producing scintillation events over a relatively large area field in response to interception of radiation, a plurality of photosensitive devices adjacent each other on one side of said photosensitive means for producing electric pulses in response to said scintillations, means responsive to said pulses by producing analog signals representing respectively the $x$ and $y$ coordinates of the scintillations in said field, pulse height analyzer means and means responsive to said analyzer means determining that said pulses are within predetermined limits by producing $z$ signals, and display means responsive to coincidence of $z$ signals and said analog signals by producing intensity changes at coordinates corresponding with the coordinates of the scintillations to thereby form an image, improved means for correcting for nonuniformity between the positions of said events and their positions on said display means comprising:

analog-to-digital converter means operative to convert said analog signals to digital $x$ and $y$ coordinate signals, memory means having first locations corresponding respectively with small area increments in said large field and operative in response to said digital coordinate signals to accumulate during an accumulate mode and store counts of said events in locations, respectively, substantially corresponding with the positions of said area increments, said counts being made when a uniform radiation source is presented to said means for producing scintillation events, means for terminating counting of said events when at least one of said first locations has accumulated a predetermined maximum number of counts when others of said locations may have fewer counts due to said nonuniformity, said memory means having second locations corresponding respectively with said area increments in said large field and operative in response to said digital coordinate signals during a run mode to store counts of said events in locations, respectively, substantially corresponding with the positions of said area increments, said counts being made when a nonuniform radiation source is presented to said means for producing scintillation events, comparator means operative during said run mode to compare the most significant bits of said accumulated counts from said first locations with a corresponding number of bits for the counts in said second locations, respectively, and to produce correction signals in numbers substantially equal to the difference in counts between the respective first and second locations, and means operative in response to said correction signals to produce $z$ signals and, hence, additional intensity changes in corresponding incremental areas of said display means.

3. The nonuniformity correction means as in claim 2 wherein:

said comparator means has first and second input means, the most significant bits of said accumulated counts in one of said first and said second locations being coupled to said first input means and the bits of the counts in the other of said first and said second locations being coupled to said second input means.

4. The nonuniformity correction means as in claim 2 wherein:

said comparator means has first and second input means, means for coupling the most significant bits of said accumulated counts in one of said first and said second locations to said first input means in a predetermined order, means for coupling the bits of said counts in the other of said first and said second locations during said run mode to said second input means with the most significant bits from said one of said first and second locations being interchanged in order with the least significant bits from the other of said first and second locations, whereby to produce said correction signals periodically for each location during said run mode.

5. The system as in claim 3 wherein said counts for events in said second locations of said memory are recycled and returned to zero for beginning another count during the run mode when the number of counts in said second locations, respectively, attain numbers of counts equal to the number represented by said most significant bits of said maximum predetermined number of counts accumulated in said one of said first locations during the accumulate mode.

6. The system as in claim 4 wherein said counts for events in said second location of said memory are recycled and returned to zero for beginning another count during the run mode when the number of counts in said second locations, respectively, attain numbers of counts equal to the number represented by said most significant bits of said maximum predetermined number of counts accumulated in said one of said first locations during the accumulate mode.

7. The system as in claim 2 including a pair of sample and hold devices each having input and output means, the input means receiving said analog $x$ and $y$ coordinate signals, respectively, and the output means supplying said signals to said analog-to-digital converter means.

8. The system as in claim 2 including counter means operative to accept the counts in said locations during said accumulate and run modes when there is a new count in a location and to increment said count by a value of one and return the count to the same location.

9. The system as in claim 2 including means responsive to $z$ signals which correspond with correction signals by shifting said signals in time relative to each other to thereby cause an incremental spatial shift of the corresponding intensity change location in the displayed image.

10. In a scintillation camera system comprising photodetector means for producing a plurality of signals for each scintillation event, means responding to said signals by producing analog signals representative of the $x$ and $y$ coordinates of each event in the field of said detector means, image display means for producing intensity changes at coordinates corresponding substantially with the coordinates of the respective events resulting in a visual image of photons emanating from a body which cause said events and improved means for correcting for deficiencies in the number of events that should have been displayed in incremental areas of said display means as compared with the number of events occurring in incremental areas at corresponding coordinates in the field of said photodetector comprising:

analog-to-digital converter means operative to convert said analog signals to binary digital number signals representing the coordinates of each event, first memory means having locations corresponding to incremental areas in said field and responsive to said signals by storing in said locations respectively, a count of the events occurring in each incremental area during an accumulate mode, means for terminating said count when one of said locations has accumulated a predetermined maximum number of counts while a source for producing uniformly distributed photons is in said field and when other of said locations may have fewer than said predetermined number of counts, run memory means having locations corresponding with said incremental areas and responsive to said signals by storing in its locations, respectively, a count of events occurring when a photon emitting body is in said field during a run mode, reference memory means having locations for storing the most significant bits of corresponding counts and locations in said first memory means during said run mode, comparator means for comparing the counts in the locations of said reference memory means with counts accumulating in said run memory means, and means controlled by said comparator means to cause said display means to produce in each of said incremental areas a number of additional intensity changes corresponding with the differences between the number of counts in said reference memory locations and said run memory locations as determined by said comparator means.

11. The system as in claim 10 wherein the bits of the counts in said run memory locations are interchanged positionally so that the most significant bit is in the position of the least significant bit, said interchanged count numbers and the uninterchanged count numbers of said reference memory locations being supplied to said comparator means.

* * * * *